US011952247B1

(12) United States Patent
Dwyer et al.

(10) Patent No.: US 11,952,247 B1
(45) Date of Patent: Apr. 9, 2024

(54) CONTROL SYSTEM FOR AN ELECTRIC PALLET JACK

(71) Applicant: Amazon Technologies, Inc., Seattle, WA (US)

(72) Inventors: James Patrick Dwyer, Maple Valley, WA (US); Robert Matthew Gruendel, Sammamish, WA (US); Eli Douglas Girod, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 17/543,603

(22) Filed: Dec. 6, 2021

(51) Int. Cl.
| | | |
|---|---|---|
| *B66F 17/00* | (2006.01) | |
| *B60W 10/04* | (2006.01) | |
| *B60W 10/20* | (2006.01) | |
| *B60W 30/09* | (2012.01) | |
| *B66F 9/065* | (2006.01) | |

(52) U.S. Cl.
CPC ............ *B66F 17/00* (2013.01); *B60W 10/04* (2013.01); *B60W 10/20* (2013.01); *B60W 30/09* (2013.01); *B66F 9/065* (2013.01); *B60W 2710/20* (2013.01); *B60W 2720/10* (2013.01); *B60W 2720/12* (2013.01)

(58) Field of Classification Search
CPC ........ B66F 17/00; B66F 9/065; B60W 10/04; B60W 10/20; B60W 30/09; B60W 2710/20; B60W 2720/10; B60W 2720/12
USPC .......................................................... 701/26
See application file for complete search history.

(56) References Cited

U.S. PATENT DOCUMENTS

| | | | | |
|---|---|---|---|---|
| 2005/0234622 | A1* | 10/2005 | Pillar ........................ | B60L 3/12 |
| | | | | 701/41 |
| 2006/0231302 | A1* | 10/2006 | Rose ........................ | B62D 5/00 |
| | | | | 180/19.3 |
| 2009/0198416 | A1* | 8/2009 | Wetterer ................ | B60W 10/04 |
| | | | | 701/41 |
| 2009/0260923 | A1* | 10/2009 | Baldini ................. | B62B 3/0612 |
| | | | | 187/226 |
| 2011/0231058 | A1* | 9/2011 | Hanna ..................... | B62B 5/063 |
| | | | | 701/41 |
| 2011/0231059 | A1* | 9/2011 | Hanna ..................... | B66F 9/065 |
| | | | | 701/41 |
| 2013/0197760 | A1* | 8/2013 | Castaneda ................. | B60T 8/17 |
| | | | | 701/41 |
| 2016/0368493 | A1* | 12/2016 | Driscall ................ | B66F 9/0755 |
| 2018/0345777 | A1* | 12/2018 | Birnschein ............. | B62D 21/12 |

(Continued)

*Primary Examiner* — Jonathan M Dager
*Assistant Examiner* — Jean W Charleston
(74) *Attorney, Agent, or Firm* — Lee & Hayes P.C.

(57) ABSTRACT

An electric pallet jack can be configured to include logic controllers that are connected to a drive system and a steering system of the electric pallet jack. The logic controllers can be in communication with one or more sensors that enable determinations of pallet jack velocity, pallet jack acceleration, and a rate of turning for the electric pallet jack. The logic controllers can be configured to provide maximum velocity, maximum acceleration, maximum deceleration, and maximum rate of turning limitations to maintain control over an object transported by the electric pallet jack. The logic controllers can determine whether the maximum thresholds of the electric pallet jack are exceeded by an operating variable and can modulate the amount of power provided by the drive system to reduce the operating variable below the associated threshold.

20 Claims, 8 Drawing Sheets

(56) References Cited

U.S. PATENT DOCUMENTS

2018/0370780 A1\* 12/2018 Marsee ................ B66F 9/0755
2019/0031238 A1\* 1/2019 Kim ........................ B60D 1/62

\* cited by examiner

CONTROL SYSTEM FOR AN ELECTRIC PALLET JACK

BACKGROUND

Presently, manual pallet jacks require significant effort to relocate objects within a warehouse and/or fulfillment facility. Individual objects can weigh hundreds and/or thousands of pounds, are difficult to control within constrained spaces, and cause facility workers to repeatedly exert themselves during logistics operations. Commonly, electric pallet jacks and powered industrial trucks are utilized to reduce strain on facility workers and increase control over heavy load objects. However, powered industrial trucks require larger spaces for navigating under load within a fulfillment facility. Additionally, electric pallet jacks do not provide sufficient control enhancement for facility workers to effectively leverage electric pallet jacks within common workspaces for manual pallet jacks. Accordingly, increasingly complex logistics operation and storage spaces require greater control over heavy objects to prevent safety incidents and ensure the safety of facility workers. Further, poor control over heavy objects increases the risk of damaging the objects being moved via pallet jack, objects stored within the fulfillment facility, and structures within the fulfillment facility, as well as potentially causing bodily harm to individuals within the fulfillment facility.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
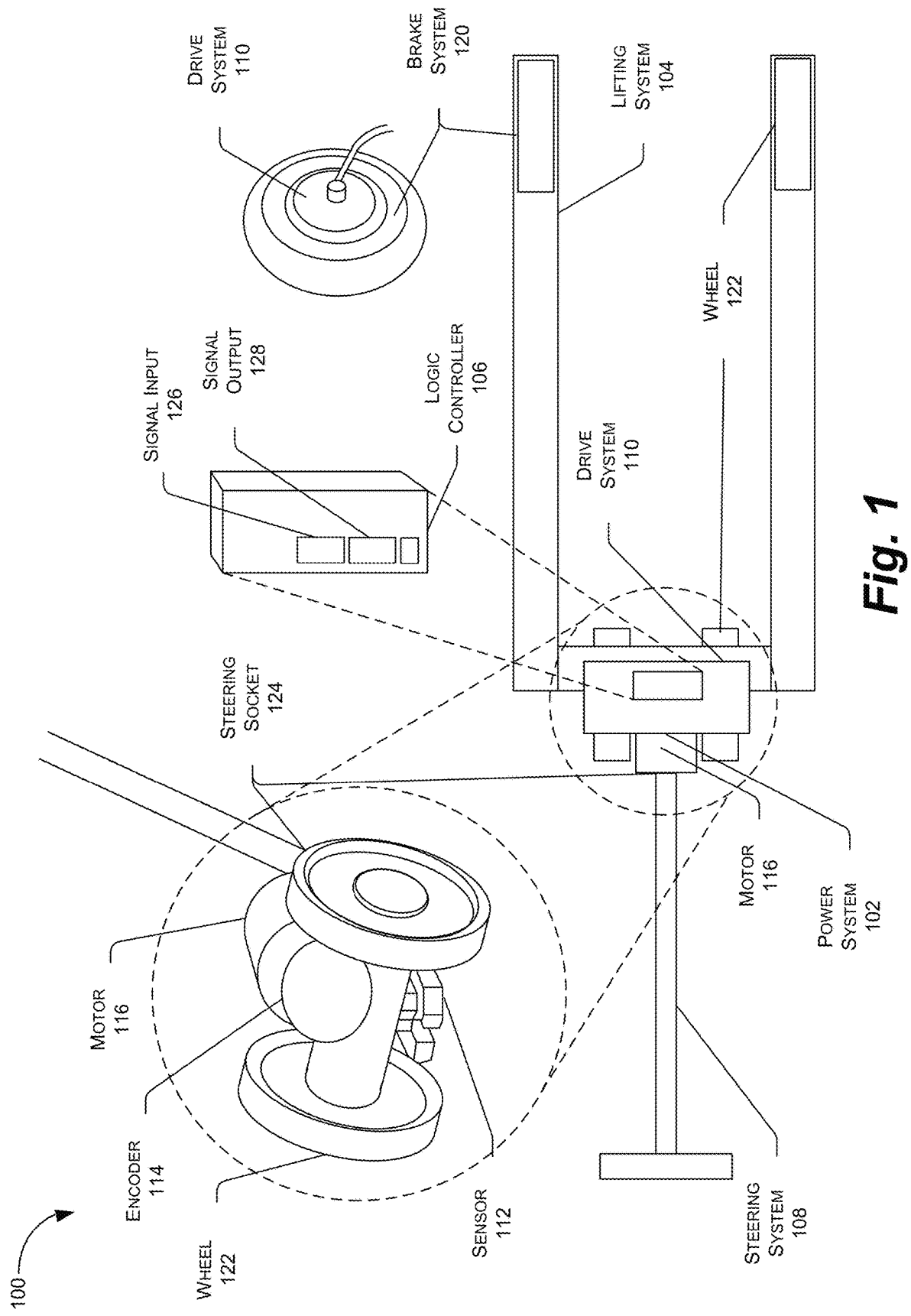
FIG. 1 illustrates a set of components that can be utilized to assemble and/or upgrade an electric pallet jack to create an advanced safety pallet jack that is capable of implementing various control structures via one or more logic controllers.

Described herein are techniques for providing an electric pallet jack with enhanced controls and safety features for moving heavy objects that would otherwise provide undue strain on facility workers. In particular, the electric pallet jack can be configured and/or modified to include sensors, controllers, and drive units that implement control structures for the operation of the electric pallet jack. More specifically, an operating state of the electric pallet jack can be determined by one or more sensors such that a controller can determine safe operating parameters for the electric pallet jack to constrain one or more drive units controlled by a facility worker. For example, the operating state can include a current velocity of the electric pallet jack, a current acceleration of the electric pallet jack, and/or a steering control provided by the facility worker. Additionally, the operating state can be compared to control structures of the controller to determine operating parameters that include a safe limited deceleration, a safe limited acceleration, a safe limited speed, and a safe limited motion based on steering control. The control structures are then utilized by the controller to constrain operation of the one or more drive units by the facility worker controlling the electric pallet jack.

In some examples, the controller can be configured to provide a safe limited deceleration for the electric pallet jack. In particular, the safe limited deceleration can be configured to prevent and/or mitigate abrupt deceleration events for emergency stops, steering operations of the electric pallet jack, standard deceleration of the electric pallet jack, and other deceleration events. The safe limited deceleration can be configured as a predefined deceleration rate and/or a determined deceleration rate that causes the one or more drive units to be controlled, via an amount of power provided to the one or more control units, such that a rate of deceleration for the electric pallet jack is limited by a maximum rate of deceleration. Additionally, the safe limited deceleration can be impacted by a load weight that the electric pallet jack is currently moving, a current velocity of the electric pallet jack, and other related values. Accordingly, the controller can receive one or more indications associated with the load weight, the current velocity, and other related values to determine the deceleration rate for the electric pallet jack.

In some examples, the controller can be configured to provide a safe limited acceleration for the electric pallet jack. In particular, the safe limited acceleration can be configured to prevent and/or mitigate abrupt acceleration events, prevent excessive acceleration during steering operations, regulate standard acceleration events, and otherwise reduce the risk of an electric pallet jack escaping from control by the facility worker. The safe limited acceleration can be configured as a predefined acceleration rate and/or a determined acceleration rate that causes the one or more drive units to be controlled, via the amount of power provided to the one or more control units, such that a rate of acceleration for the electric pallet jack is limited by a maximum rate of acceleration. Additionally, the safe limited acceleration can be impacted by a load weight that the electric pallet jack is currently moving, a current velocity of the electric pallet jack, and other related values. Accordingly, the controller can receive one or more indications associated with the load weight, the current velocity, and other related values to determine the acceleration rate for the electric pallet jack.

In some examples, the controller can be configured to provide a safe limited speed for the electric pallet jack. In particular, the safe limited speed can define a minimum and/or a maximum speed for the electric pallet jack to ensure that the electric pallet jack remains under the control of a facility worker. More specifically, the safe limited speed can be configured to prevent and/or mitigate abrupt acceleration events, prevent excessive acceleration during steering operations, regulate standard acceleration events, and otherwise reduce the risk of an electric pallet jack escaping from control by the facility worker. The safe limited acceleration can be configured as a predefined acceleration rate and/or a determined acceleration rate that causes the one or more drive units to be controlled, via the amount of power provided to the one or more control units, such that a rate of acceleration for the electric pallet jack is limited by a maximum rate of acceleration. Additionally, the safe limited acceleration can be impacted by a load weight that the electric pallet jack is currently moving, a current velocity of the electric pallet jack, and other related values. Accordingly, the controller can receive one or more indications associated with the load weight, the current velocity, and other related values to determine the acceleration rate for the electric pallet jack.

In some examples, the controller can be configured to provide a safe limited speed for the electric pallet jack. In particular, the safe limited speed can define a minimum and/or a maximum speed for the electric pallet jack to ensure that the electric pallet jack remains under the control of a facility worker. More specifically, the safe limited speed can be configured to prevent and/or mitigate abrupt acceleration events, prevent excessive acceleration during steering operations, regulate standard acceleration events, and otherwise reduce the risk of an electric pallet jack escaping from control by the facility worker. The safe limited acceleration can be configured as a predefined acceleration rate and/or a determined acceleration rate that causes the one or more drive units to be controlled, via the amount of power provided to the one or more control units, such that a rate of acceleration for the electric pallet jack is limited by a maximum rate of acceleration. Additionally, the safe limited acceleration can be impacted by a load weight that the electric pallet jack is currently moving, a current velocity of the electric pallet jack, and other related values. Accordingly, the controller can receive one or more indications associated with the load weight, the current velocity, and other related values to determine the acceleration rate for the electric pallet jack.

It should be noted that the various control structures that are implemented for the electric pallet jack enables the electric pallet jack to move heavy loads within confined spaces that are not commonly accessible via current electric pallet jacks and powered industrial trucks. More specifically, fulfillment facilities, warehouses, and other storage facilities with constrained clearance benefit from the enhanced controls of the electric pallet jack. Additionally, the enhanced controls can prevent out of control loads, reduced collision events, reduced overturn events, and reduced spillage of loads. It should be noted that collision events may include instances where the electric pallet jack and objects carried by the electric pallet jack run into, collide with, and/or otherwise damage facility workers, facility structures, and/or stored objects within the facility. Similarly, overturn events may include instances where the electric pallet jack and objects carried by the electric pallet jack roll over due to sloped ground and/or turning. More specifically, the electric pallet jack can be tipped over due to a load weight of an object shifting during a turn such that the electric pallet jack and/or the object overbalance and fall over during operation. Alternatively, the object can shift during a turn such that the object falls off the electric pallet jack, flips over on the electric pallet jack, and/or otherwise overturn. For example, implementation of the safe limited acceleration, the safe limited deceleration, and the safe limited speed can enable the electric pallet jack to effectively operate under a wide range of loads while preventing facility workers from accidently causing damage to the facility, inventory of the facility, and/or the load itself. Further, the control structures can ensure a safer work environment for the facility workers and reduce injuries.

Currently, electric pallet jacks have single channel control structures that fail to compensate for variations in load weight on the electric pallet jack. In particular, current electric pallet jacks operate with systems that are configured to maintain speed and acceleration under load. However, the systems that maintain speed and acceleration for current electric pallet jacks are configured to compensate for load and maintain the speed profile provided by an operator (e.g., via an acceleration control and/or a speed control input via electric pallet jack controls). Accordingly, an electric pallet jack with enhanced control structures can further modify the speed profile provided by the operator to enable better control of the electric pallet jack, under load, by facility workers. More specifically, different operating scenarios of the electric pallet jack may pose different operating hazards that are not accounted for by the systems that exist on current electric pallet jacks.

Additionally, the single channel control structures fail to incorporate redundancies to prevent failure of the controls for the electric pallet jack. Utilizing single channel control structures causes individual controls to rely on single sensors to make the determinations for how the electric pallet jack is to be controlled. In contrast, the safe limited acceleration, the safe limited deceleration, and the safe limited speed can be configured such that multiple sensors are independently monitoring the status of the electric pallet jack to determine operation variables (e.g., velocity, torque, steering angle, etc.) to ensure that the control structures output accurate controls and detect when a sensor or control structure fails.

FIG. 1 illustrates a set of components that can be utilized to assemble and/or upgrade an electric pallet jack to create an advanced safety pallet jack that is capable of implementing various control structures. In general, the electric pallet jack is a system that includes a power system 102, a lifting system 104, a logic controller 106, a drive system 110, and a steering system 108. The power system 102 is commonly configured as a battery, an internal combustion engine, and/or other power source that supplies and/or generates the electrical power that is consumed by the electric pallet jack to lift objects within a storage facility (e.g., lift a pallet of food items, a pallet of electronics, a refrigerator, etc.), to move the objects within the storage facility (e.g., moving the pallet of food items from a warehouse type facility to a truck for transportation), and to navigate the storage facility. Additionally, the lifting system 104 can include a pneumatic system, hydraulic system, an actuator driven system, and/or other system that is configured to elevate a portion of and/or all of the electric pallet jack and lift the object being transported off the ground. While discussed in greater detail below, one or more logic controllers 106 may be configured to implement various control structures that can include a velocity limit controller (e.g., determines maximum velocity and minimum velocity for the electric pallet jack while transporting a load weight), an acceleration limit controller (e.g., determines maximum rate of acceleration and minimum rate of acceleration) for the electric pallet jack while transporting a load weight), a turn rate limit controller (e.g., determines maximum rate of turning and minimum rate of turning) for the electric pallet jack while transporting a load weight, and other related logic controllers. Further, a drive system 110 and a steering system 108 can be configured to move the electric pallet jack and any objects carried by the electric pallet jack.

In some examples, the lifting system 104 can include one or more beams (e.g., FIG. 1 illustrates two beams) that are configured to extend under an object. Additionally, the one or more beams of the lifting system 104 can be equipped with hydraulic cylinders, pneumatic cylinders, mechanical actuators, and other devices that are configured to raise and lower the object from the ground, on top of the one or more beams, via a control operated by a facility worker. The lifting system 104 may be powered by the power system 102 such that, when the facility worker activates the control, the electric pallet jack exerts the force necessary to carry the object without straining the facility worker. Once the lifting system 104 has raised the object, the facility worker can maneuver the electric pallet jack with the object via the power system 102 providing power to the drive system 110 and the steering system 108.

In some examples, a system 100 can be configured to manage acceleration, deceleration, speed, and other operating variables for the electric pallet jack. More specifically, the system 100 can include one or more sensors 112 and/or one or more encoders 114 that are configured to determine current operating variables for the electric pallet jack. Additionally, the system 100 can include one or more logic controllers 106 that are configured to implement one or more control structures for the electric pallet jack. Further, the one or more logic controllers 106 can be in communication with various control components such as the drive system 110 and/or a brake system 120.

In some examples, components of the electric pallet jack can be monitored by the one or more sensors 112 and/or the one or more encoders 114. In particular, the one or more sensors 112 can be configured to monitor a wheel 122 of the electric pallet jack, a steering socket 124, and/or other components of the electric pallet jack to determine one or more operating variables. Similarly, the one or more encoders 114 can be configured to provide indications of operation variables that are determined from operation of the electric pallet jack. For example, the one or more encoders 114 can report a rotational velocity of a motor 116, a torque output by the motor 116, and/or other operating variables. It should be noted that the one or more operating variables can be determined by the one or more sensors 112 and/or the one or more encoders 114 and transmitted to the one or more logic controllers 106 on a periodic, aperiodic, and/or continuous basis.

In some additional examples, the one or more sensors 112 and/or the one or more encoders 114 can be configured to transmit one or more indications that report readings from the components of the electric pallet jack that are being monitored. For example, the one or more sensors 112 can report a rotation speed for the wheel 122, an angle of the steering socket 124, and/or other value associated with another component. Similarly, the one or more encoders 114 can report the current operating state of a given component of the electric pallet jack, such as the motor 116. It should be noted that the indications transmitted by the one or more sensors 112 and/or the one or more encoders 114 can be utilized by the logic controller 106 to determine the associated operating variable. The rotation speed of the wheel 122 can be utilized to determine a velocity and a rate of acceleration for the electric pallet jack. Additionally, the angle of the steering socket 124 can be utilized to determine whether the electric pallet jack is moving linearly or a turn angle for the electric pallet jack. Further, the torque output of the motor 116, in combination with the rotational velocity of the motor 116 and/or the velocity of the electric pallet jack, can be utilized to determine a load weight that the electric pallet jack is transporting (e.g., the weight of the object and/or objects that the electric pallet jack is transporting). Accordingly, by monitoring various components of the electric pallet jack, the one or more sensors 112 and/or the one or more encoders 114 can be utilized to determine operating variables of the electric pallet jack.

In some further examples, the one or more sensors 112 can be configured to determine values that correspond to physical states for components of the electric pallet jack. In particular, the one or more sensors 112 can be installed to identify values for the power system 102, the steering system 108, the drive system 110, and other systems of the electric pallet jack. For example, the one or more sensors 112 can be configured to determine values for physical states such as an angle between a steering column of the steering system 108 and the steering socket 124, a number of rotations per minute of a drive shaft extending from the motor 116, a number of rotations per minute of the wheel(s) 122 and/or an axle coupled to the wheel(s) 122, and other variables that may be utilized to determine the pallet jack velocity, whether the pallet jack is accelerating, and other information regarding the operating state of the electric pallet jack. Similarly, the one or more encoders 114 can be configured to determine values that correspond to operating states of the electric pallet jack. In particular, the one or more encoders 114 can be installed to identify values for the power system 102, the steering system 108, the drive system 110, and other systems of the electric pallet jack. For example, the one or more encoders 114 can be configured to determine values for operating states such as a power output of the motor 116, a turn rate provided to the wheels 122 by the steering system 108, and other operating states associated with the pallet jack.

In some examples, the one or more logic controllers 106 can be configured to receive the indications from the one or more sensors 112 and/or the one or more encoders 114, determine the operating variables of the electric pallet jack, and provide commands to the drive system 110 and/or the brake system 120 that implement the control structures of the one or more logic controllers 106. As noted above, the operating variables of the electric pallet jack may be determined based on the indications generated by the one or more sensors 112 and the one or more encoders 114. In particular, the one or more logic controllers 106 can be associated with a system controller that functions as an interface between the one or more logic controllers 106 and the electric pallet jack. The system controller can be configured to translate the indications received from the one or more sensors 112 and/or the one or encoders 114 into operating variables that are utilized by the one or more logic controllers 106. Alternatively, the one or more logic controllers 106 can be configured with an input interface that receives the indications and enables the logic controllers 106 to convert the indications into the operating variables. Accordingly, the one or more logic controllers 106 can receive, via a signal input interface 126, the indications and/or the operating variables that are associated with the one or more control structures of the one or more logic controllers 106. Similarly, the one or more logic controllers 106 can transmit, via a signal output interface 128, the indications and/or the operating variables that are associated with the one or more control structures of the one or more logic controllers 106.

In some additional examples, the one or more logic controllers 106 can be configured to implement the control structures for the electric pallet jack. In particular, the one or more logic controllers 106 can be configured to implement the controls for acceleration, deceleration, velocity, and other operating variables (e.g., rate of turn). The control structures of the one or more logic controllers 106 can be configured to interoperate such that the control structures for acceleration, deceleration, velocity, and other operating variables influence the outputs of the control structures. For example, while a control structure for a rate of turning is determining rate of turning limits, the rate of turning limits may also influence the control structures and logic controllers 106 associated with acceleration, deceleration, and speed. Where the rate of turning limits are being utilized and the electric pallet jack is associated with the rate of turning, the one or more logic controllers 106 can incorporate additional constraints for the acceleration and deceleration of the electric pallet jack to ensure that the electric pallet jack does not over turn and/or that the facility worker does not lose control over the electric pallet jack. Similarly, the one or more logic controllers 106 can incorporate additional constraints for maximum velocity of the electric pallet jack, wherein the maximum velocity is reduced to during turning events to maintain operation of the electric pallet jack.

In some further examples, the one or more logic controllers 106 can be configured to implement the control structures via control systems of the electric pallet jack. More specifically, the one or more logic controllers 106 may be in communication with the drive system 110 and the brake system 120 to limit operation of the drive system 110 and/or the brake system 120. By limiting operation of the drive system 110 and/or the brake system 120, the one or more logic controllers 106 can modulate the maximum velocity, the maximum rate of acceleration, and the maximum rate of deceleration based on the current operating variables of the electric pallet jack. Additionally, the drive system 110 can be controlled by the one or more logic controllers 106 to provide increased and/or reduced power while moving an object. For example, acceleration of the electric pallet jack is caused by an increase in the amount of power that is output by a motor (e.g., the motor 116) over a period of time such that velocity of the electric pallet jack increases over time. Additionally, the one or more logic controllers 106 can be configured to limit the maximum velocity by limiting the maximum power output by the motor and/or the maximum rate of acceleration by limiting the maximum rate of increase for the power output by the motor. Similarly, deceleration of the electric pallet jack is caused by an increase in the amount of force that the brake system 120 applies to a wheel (e.g., the wheel 122) to reduce the velocity of the electric pallet jack over time. Further, the one or more logic controllers 106 can be configured to limit the amount of force applied by the brake system 120 to limit a maximum rate of deceleration for the electric pallet jack.

It should be noted that the system 100 illustrated by FIG. 1 is intended to be demonstrative of portions of the electric pallet jack that are monitored and influenced by the one or more logic controllers 106. However, the one or more logic controllers 106 can be configured to monitor and maintain variables outside of maximum velocity, maximum acceleration, and maximum deceleration. For example, there may be control scenarios where minimum velocity, minimum acceleration, and minimum deceleration are maintained by the one or more logic controllers 106. Additionally, the logic controllers 106 may be overridden by manual controls (e.g., minimum velocity being overridden by facility worker activating a brake, maximum deceleration being overridden by an emergency brake being activated, etc.). Further, the one or more logic controllers can be configured to maintain other variables of the electric pallet jack such as the maximum rate of turning, a maximum distance from the facility worker, a minimum distance from the facility worker, proximity distances associated with structures around the electric pallet jack, and other variables within a storage facility.

It should additionally be noted that the system 100 illustrated by FIG. 1 can be configured to include redundant sensors and determinations for the one or more logic controllers 106. In particular, the one or more logic controllers 106 may receive a plurality of input signals from the one or more sensors 112 and/or the one or more encoders 114 that can be independently be used to determine operating variables such as velocity, acceleration, and deceleration. For example, the velocity of the electric pallet jack may be determined, independently, for each individual wheels of the electric pallet jack. The independent determination of velocity enables verification of the velocity and confirmation that the one or more sensors 112 and/or the one or more encoders 114 are working properly. Alternatively, or in addition, the one or more sensors 112 and/or the one or more encoders can enable the velocity to be calculated based on a rate of rotation for the wheel 122 and a measurement of rotations per minute for the motor 116 (in combination with any gear ratios). Further, the values of individual components may be utilized to validate additional values. For example, the rate of turning can be determined by monitoring velocity for individual wheels of the electric pallet jack and determining the rate of turning based on the difference in velocity between wheels that share an axis. The rate of turning determined based on the wheels can be utilized to validate the rate of turning determined based on an angle of the steering socket 124. Accordingly, individual values determined on one or more indications from the one or more sensors 112 and/or the one or more encoders 114 can be validated by the one or more logic controllers 106 to ensure that the correct control is implemented for the electric pallet jack.

For example, the logic controllers 106 can be configured to determine a first rotational velocity for a first wheel, a second rotational velocity for a second wheel, and a third rotational velocity of the motor 116 and a gear ratio between the drive motor and the one or more wheels 122. It should be noted that rotational velocity may refer to a number of rotations per unit time that a wheel, a drive shaft, or other rotating components completes around an axis. For example, a rotational velocity may be determined to be 10 rotations per minute, 20 rotations per minute, etc. that may correspond to the electrical pallet jack moving at a speed of 10 miles per hour. Additionally, the logic controllers 106 can verify the individual rotational velocities and to determine whether any abnormal measurements have been detected. From the verified rotational velocities (or changes in rotational velocities), the logic controllers 106 can determine the pallet jack velocity, the pallet jack acceleration, and other values related to controlling the drive system 110. Accordingly, the incorporation of redundant sensors, encoders, and measurements improves the robustness of the electric pallet jack and reduces instances of hazardous and/or damaging incidents.

Figure 2:
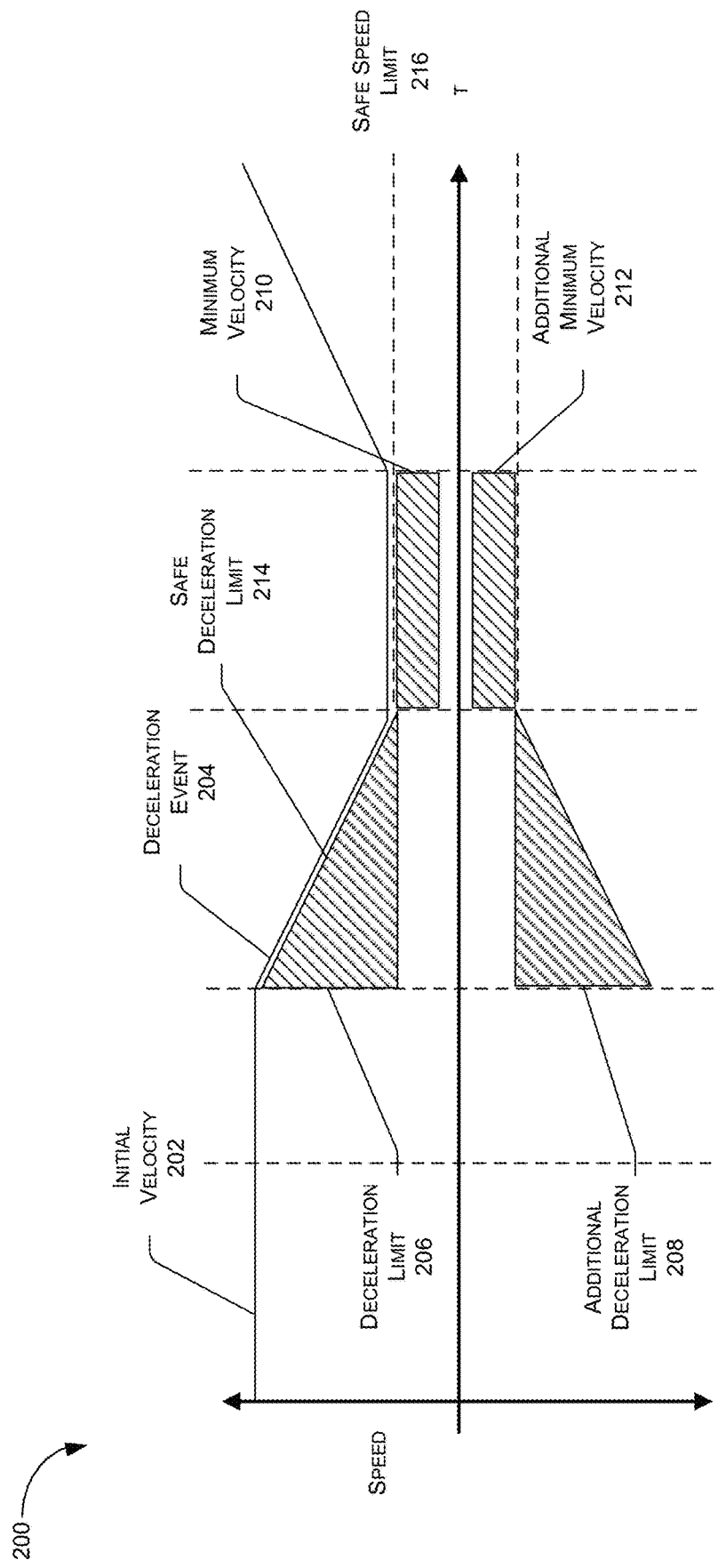
FIG. 2 illustrates a diagram for managing a maximum deceleration limit and a minimum velocity limit for an electric pallet jack in a loaded and/or unloaded state to ensure that control over the electric pallet jack is not lost and/or that the object transported by the electric pallet jack is not damaged.

FIG. 2 illustrates a diagram for managing a maximum deceleration limit and a minimum velocity limit for an electric pallet jack in a loaded and/or unloaded state to ensure that control over the electric pallet jack is not lost and/or that the object transported by the electric pallet jack is not damaged. It should be noted that the diagram represents the velocity versus time chart for an electric pallet jack, wherein the shaded portions of the diagram indicate implemented control structures by the one or more logic controllers 106. While the illustrated velocity value does not cross into the shaded region in the illustrated diagram of FIG. 2, should the velocity (or acceleration/deceleration) of the electric pallet jack enter a shaded region, the controller is configured to execute velocity control(s) and/or acceleration control(s) to modify a pallet jack velocity and/or a pallet jack acceleration and rectify potentially hazardous and/or dangerous operation of the electric pallet jack. For example, where the electric pallet jack decelerates at a deceleration rate exceeding a threshold represented by a slope of the deceleration limit 206, an acceleration limit controller/a deceleration limit controller may operate to reduce the deceleration rate of the electric pallet jack.

In some examples, the electric pallet jack can be moved, during an initial timeframe, at an initial velocity 202. Additionally, a deceleration event 204 can be detected and a deceleration limit 206 be implemented by a logic controller. It should be noted that the logic controller can be configured to provide the deceleration limit 206 for negative acceleration while the electric pallet jack is moving with positive velocity and an additional deceleration limit 208 for positive acceleration while the electric pallet jack is moving with negative velocity. Further, the electric pallet jack may be associated with a minimum velocity 210 for positive velocity and an additional minimum velocity 212 for negative velocity. Accordingly, the logic controller can be configured to maintain a safe deceleration limit 214 and a safe speed limit 216 for the electric pallet jack.

For example, the electric pallet jack may lift a pallet of objects (e.g., via the lift system 104) and begin to move at the initial velocity 202. As the electric pallet jack approaches a destination for the pallet of objects (e.g., depositing the pallet of objects within a logistics vehicle), the facility worker operating the electric pallet jack may begin to decelerate the electric pallet jack, initiating the deceleration event 204. As illustrated by FIG. 2, a logic controller (e.g., an acceleration limit controller) may determine the deceleration limit 206 based at least on a pallet jack velocity and a pallet jack load weight. The logic controller can continue to monitor a rate of deceleration (e.g., the slope of the line during the deceleration event 204) and determine whether the rate of deceleration for the electric pallet jack exceeds a maximum rate of deceleration, otherwise referred to as a safe deceleration limit 214, associated with the deceleration limit 206. It should be noted that the safe deceleration limit 214 is determined by the logic controller to be the maximum rate of deceleration that is allowable for an object having the load weight to prevent the object and/or the electric pallet jack from overturning, the object becoming dislodged, and/or other potential damage/harm. The logic controller can be configured to reduce the rate deceleration during the deceleration event should the rate of deceleration exceed the deceleration limit 206. By preventing the deceleration rate from exceeding the deceleration limit 206, the logic controller can prevent the pallet of objects from sliding off the one or more beams of the lifting system 104 and prevent any damage or injury caused by the pallet of objects dislodging itself. \

Figure 3:
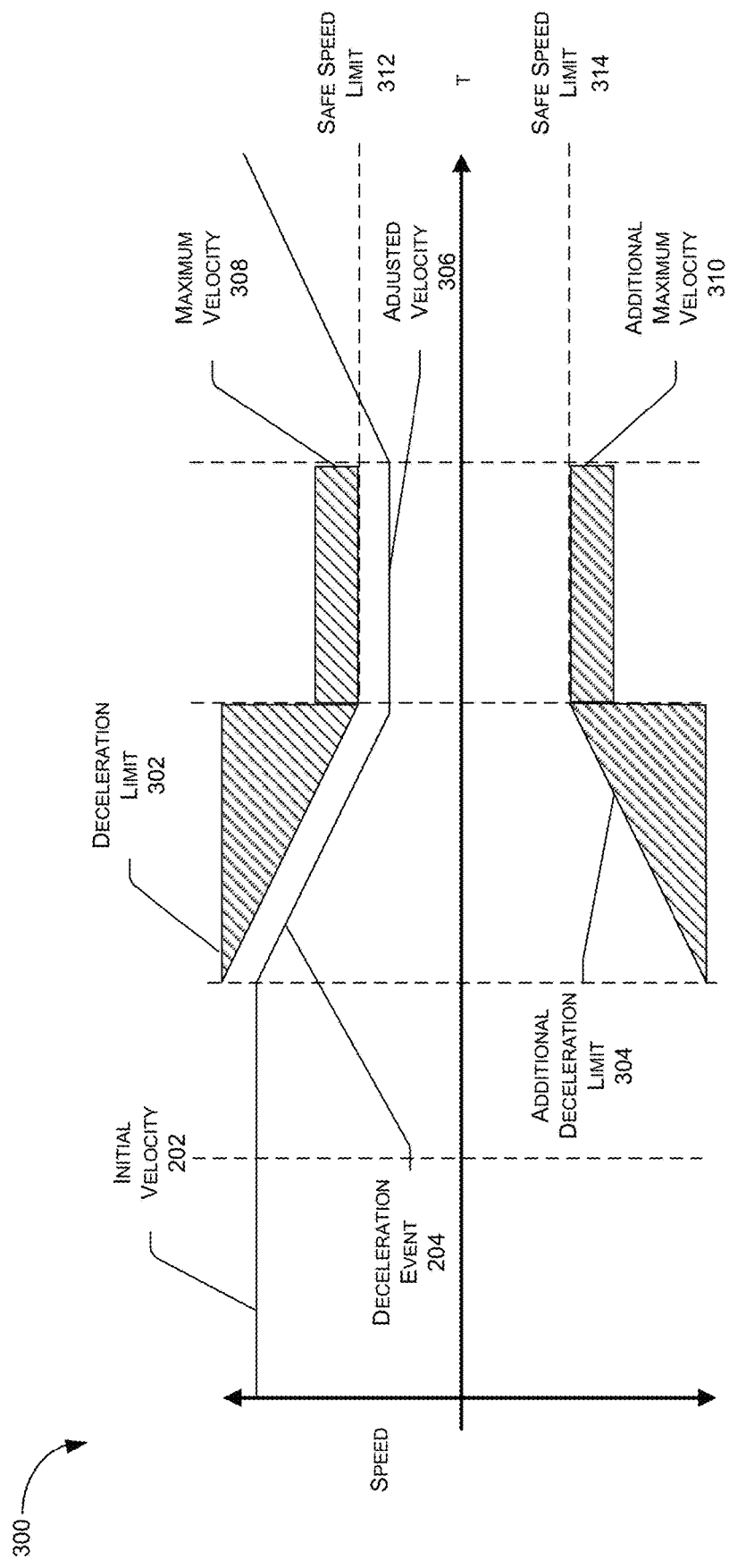
FIG. 3 illustrates a diagram for managing a minimum deceleration limit and a maximum velocity limit for an electric pallet jack in a loaded and/or unloaded state to ensure that control over the electric pallet jack is not lost and/or that the object transported by the electric pallet jack is not damaged.
Figure 4:
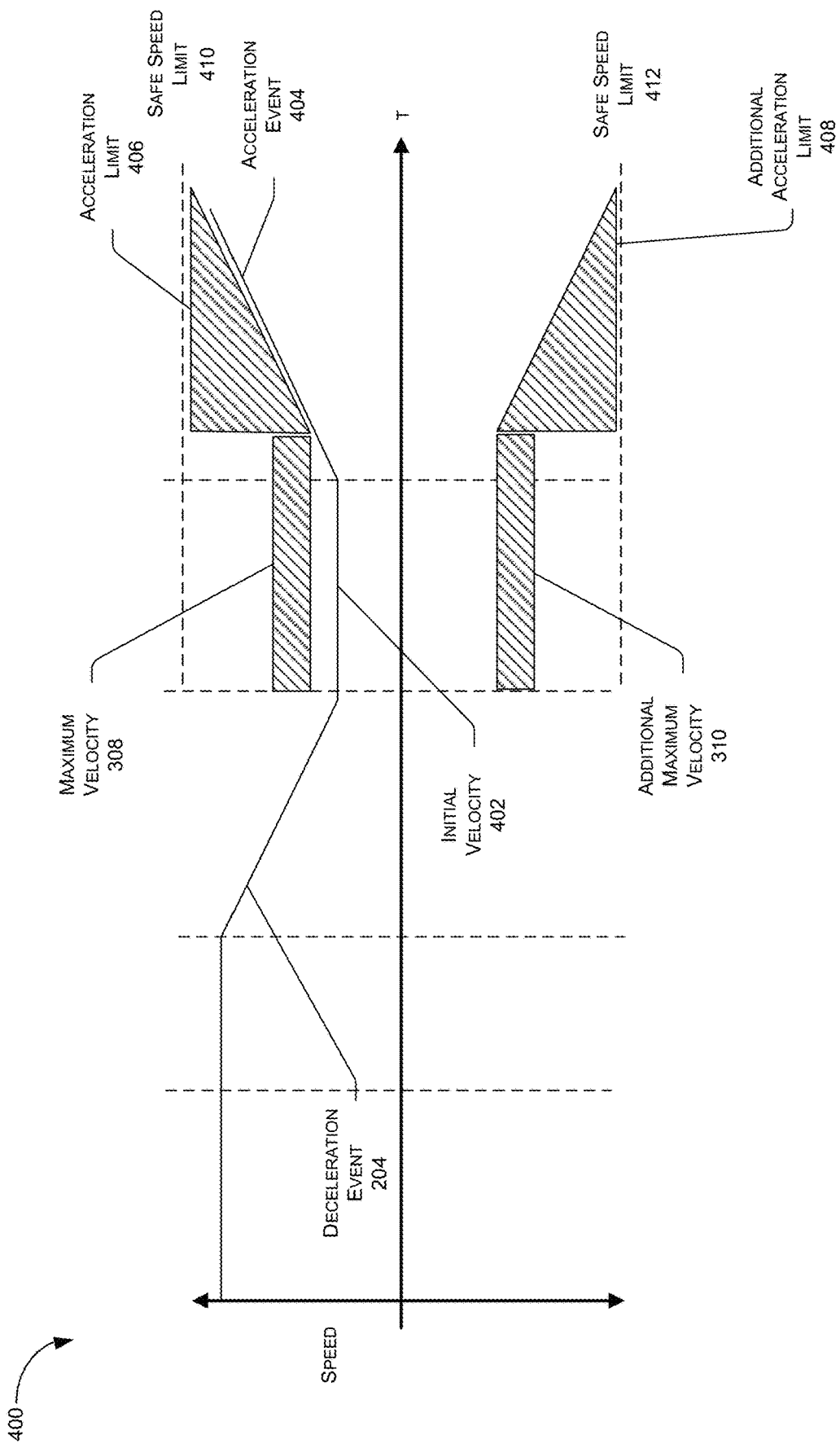
FIG. 4 illustrates a diagram for managing a deceleration limit and a minimum velocity limit for an electric pallet jack in a loaded and/or unloaded state to ensure that control over the electric pallet jack is not lost and/or that the object transported by the electric pallet jack is not damaged.

It should be noted that FIGS. 2-4 illustrate control structures (e.g., the deceleration limit 206, the minimum velocity 210, the additional deceleration limit 208, the additional minimum velocity 212, etc.) that are configured to monitor and generate velocity/acceleration controls for positive velocity, negative velocity, positive acceleration, negative acceleration, positive deceleration, and negative deceleration. Further, deceleration and acceleration can be managed as inverses (e.g., positive acceleration equals negative deceleration) and/or as independent values (e.g., acceleration is triggered and managed via the drive system 110 and deceleration is managed via the brake system 120). Additionally, positive and negative values can be determined based on an orientation of a facility worker operating the electric pallet jack. For example, and as illustrated by FIG. 1, a pallet jack can be configured such that the facility worker is facing the electric pallet jack and any objects being transported via the electric pallet jack. As a result, positive velocity would correlate to forward movement (e.g., walking forward) by the facility worker and "pushing" (the drive system 110 providing substantially all of the driving force for the objects being transported) the electric pallet jack. Conversely, negative velocity would correlate to backwards movement (e.g., walking backwards) by the facility worker and "pulling" the electric pallet jack. Similarly, positive acceleration and negative acceleration correspond to increases in positive velocity and negative velocity, respectively. Positive deceleration and negative deceleration correspond to decreases in positive velocity and negative velocity respectively. Further, positive acceleration can also be associated with a reduction in negative velocity and negative acceleration can also be associated with a reduction in positive velocity.

In some examples, the deceleration event 204 may be triggered by a facility worker that is operating the electric pallet jack and/or otherwise triggered for the electric pallet jack (e.g., proximity sensor determines that the electric pallet jack is to be slowed and/or stopped). The electric pallet jack can initially be operating at the initial velocity 202 that is determined for and/or by the logic controller based on one or more sensor/encoder indications. At the initiation of the deceleration event 204, the logic controller can determine a rate of deceleration that is caused by a motor of the electric pallet jack reducing power output to a drive wheel and/or by a brake system applying breaking force for the electric pallet jack. Additionally, the logic controller can be configured to identify the rate of deceleration, determine whether the rate of deceleration is greater than the deceleration limit 206, and implement deceleration reductions where the rate of deceleration is greater than the deceleration limit 206. Further, the logic controller can perform checks on the rate of deceleration periodically, aperiodically, and/or continuously during the deceleration event until the electric pallet jack reaches a stop or a minimum velocity 210.

In some examples, the logic controller can be configured to manage the deceleration limit 206 and the minimum velocity 210 for electric pallet jacks that have positive velocity. The deceleration limit 206 and the minimum velocity 210 are control structures that are implemented by the logic controller (e.g., an acceleration/deceleration limit controller) to prevent loss of control (e.g., the facility worker is unable to operate controls of the electric pallet jack effectively), overturn events (e.g., the electric pallet jack and/or the object transported by the pallet jack falling over), and other dangerous and/or hazardous events. In particular, the deceleration limit 206 can be configured to manage negative acceleration (e.g., a negative change in velocity over time) during the deceleration event 204. Additionally, the deceleration limit 206 can be associated with a safe deceleration limit 214 (e.g., the maximum rate of deceleration that is permitted by the deceleration limit 206 for the load weight of the object being transported) that may be altered by the logic controller based on other attributes of the electric pallet jack. For example, the safe deceleration limit 214 may alter the deceleration limit 206 implemented by the logic controller based on whether the electric pallet jack is turning, the rate of turning, a load weight that the pallet jack is carrying, and other variables that may change between individual deceleration events 204. Accordingly, the deceleration limit 206 and the minimum velocity 210 may be adjusted by the logic controller to ensure that the deceleration limit 206 is determined to prevent shifting of a load being carried, loss of control over the electric pallet jack, facility worker injury due to collision, and/or other damages potentially caused by rapid deceleration.

In some additional examples, the logic controller can be configured to manage the deceleration limit 206 and the minimum velocity 210 for electric pallet jacks independent of a load weight associated with an object being moved via the electric pallet jacks. In particular, the deceleration limit 206 and the minimum velocity 210 control structures can be configured to manage negative acceleration during the deceleration event 204 and the velocity of the electric pallet jack. Additionally, the deceleration limit 206 can be associated with a safe deceleration limit 214 (e.g., a programmable maximum rate of deceleration that is permitted by the deceleration limit 206 for the electric pallet jack) that may be altered by the logic controller based on other attributes of the electric pallet jack. For example, the safe deceleration limit 214 may alter the deceleration limit 206 implemented by the logic controller based on whether the electric pallet jack is turning, the rate of turning, an operating environment, and/or an operating mode that has been selected by the operator. It should be noted that the safe deceleration limit may be determined independent of the load weight due to fluctuations in object height and center of gravity that are not determinable via the load weight. Accordingly, the deceleration limit 206 and the minimum velocity 210 may be adjusted by the logic controller to ensure that the deceleration limit 206 is determined to prevent shifting of a load being carried, loss of control over the electric pallet jack, facility worker injury due to collision, and/or other damages independent of the load weight of the object being transported.

In some further examples, the logic controller can be configured to manage the additional deceleration limit 208 and the additional minimum velocity 212 for electric pallet jacks that have negative velocity. In particular, the additional deceleration limit 208 can be configured to manage positive acceleration during a deceleration event where the electric pallet jack is moving with negative velocity (e.g., the electric pallet jack is in reverse). It should be noted that while the deceleration limit 206 and the additional deceleration limit 208 appear to be substantially equal, the additional deceleration limit 208 can be configured to enforce a different rate of deceleration limit from the deceleration limit 206. More specifically, moving an object in reverse may be associated with different constraints on deceleration due to the configuration of the electric pallet jack. Accordingly, the additional deceleration limit and the additional minimum velocity 212 can be configured to ensure that reverse motion of the electric pallet jack can be safely managed by the logic controller.

In some examples, the deceleration event 204 can be a manual deceleration event that is triggered by a facility worker. Under manual deceleration, it may be unnecessary to implement the minimum velocity 210 due to the facility work determining what the minimum velocity 210 should be. Additionally, the deceleration limit can be configured to reducing the braking force applied by the electric pallet jack should the facility worker apply excess braking to the electric pallet jack.

In some additional examples, the deceleration event 204 can be an automatic deceleration that is triggered by the logic controller or an associated logic controller. For example, the logic controller can receive an indication that a turn has been initiated for the electric pallet jack. Due to the risk for the electric pallet jack to overturn, the logic controller may trigger a deceleration event during the turn. However, the logic controller may also determine the minimum velocity that is to be maintained such that the turn is completed by the electric pallet jack while preventing the electric pallet jack from overturning. Accordingly, the logic controller can implement the deceleration event 204 to prevent damage or hazardous situations. It should be noted that other situations where the logic controller may implement the deceleration limit include collision prevention (e.g., proximity sensor triggers deceleration event 204), entrance to a high traffic environment (e.g., location sensor determines that reduced speed may prevent collisions), and/or other situations within the storage facility.

FIG. 3 illustrates a diagram for managing a minimum deceleration limit and a maximum velocity limit for an electric pallet jack in a loaded and/or unloaded state to ensure that control over the electric pallet jack is not lost and/or that the object transported by the electric pallet jack is not damaged. In particular, the electric pallet jack can be move, during an initial timeframe, at an initial velocity 202. Additionally, a deceleration event 204 can be detected and/or caused by a logic controller. The logic controller can be configured to implement a deceleration limit 302 and/or an additional deceleration limit 304 during the deceleration event 204 to reduce the electric pallet jack from the initial velocity 202 to an adjusted velocity that is less than or equal to a maximum velocity 308 and/or an additional maximum velocity 310. More specifically, the adjusted velocity 306 may be between a safe speed limit 312 and a safe speed limit 314 that constrain positive velocity and negative velocity for the electric pallet jack. It should be noted that the logic controller can be configured to provide the deceleration limit 302 for negative acceleration while the electric pallet jack is moving with positive velocity and an additional deceleration limit 304 for positive acceleration while the electric pallet jack is moving with negative velocity.

It should be noted that the diagram represents the velocity versus time chart for an electric pallet jack, wherein the shaded portions of the diagram indicate implemented control structures by the one or more logic controllers 106. While the illustrated velocity value does not cross into the shaded region in the illustrated diagram of FIG. 3, should the velocity (or acceleration/deceleration) of the electric pallet jack enter a shaded region, the controller is configured to execute velocity control(s) and/or acceleration control(s) to modify a pallet jack velocity and/or a pallet jack acceleration and rectify potentially hazardous and/or dangerous operation of the electric pallet jack. For example, where the electric pallet jack decelerates at a deceleration rate that is less than a threshold represented by a slope of the deceleration limit 302, an acceleration limit controller/a deceleration limit controller may operate to increase the deceleration rate of the electric pallet jack.

For example, the electric pallet jack may lift a pallet of objects (e.g., via the lift system 104) and begin to move at the initial velocity 202. As the electric pallet jack approaches a destination for the pallet of objects (e.g., depositing the pallet of objects within a logistics vehicle), the facility worker operating the electric pallet jack may begin to decelerate the electric pallet jack, initiating the deceleration event 204. As illustrated by FIG. 2, a logic controller (e.g., an acceleration limit controller) may determine the deceleration limit 302 based at least on a pallet jack velocity and a pallet jack load weight. The logic controller can continue to monitor a rate of deceleration (e.g., the slope of the line during the deceleration event 204) and determine whether the rate of deceleration for the electric pallet jack is less than a minimum rate of deceleration that would prevent collision with the logistics vehicle associated with the deceleration limit 302. The logic controller can be configured to increase the rate of deceleration during the deceleration event 204 should the rate of deceleration be less than the minimum rate of deceleration illustrated by the deceleration limit 302. By implementing the deceleration limit 302, the logic controller can prevent the pallet of objects from failing to stop in time and colliding the logistics vehicle while the pallet of objects is being loaded. It should be noted that the deceleration limit 302 and the deceleration limit 206 can act in parallel such that the deceleration limit 302 can be prevented from increasing the rate of deceleration for the electric pallet jack over the safe deceleration limit 214.

In some examples, and similar to FIG. 2, the deceleration event 204 may be triggered by a facility worker that is operating the electric pallet jack and/or otherwise triggered for the electric pallet jack (e.g., proximity sensor determines that the electric pallet jack is to be slowed and/or stopped). The electric pallet jack can initially be operating at the initial velocity 202 that is determined for and/or by the logic controller based on one or more sensor/encoder indications. At the initiation of the deceleration event 204, the logic controller can determine a rate of deceleration that is caused by a motor of the electric pallet jack reducing power output to a drive wheel and/or by a brake system applying breaking force for the electric pallet jack. Additionally, the logic controller can be configured to identify the rate of deceleration, determine whether the rate of deceleration is less than the deceleration limit 302, and potentially increase the rate of deceleration where the rate of deceleration is less than the deceleration limit 302. It should be noted that the deceleration limit 302 may be configured to interact with the deceleration limit 206 to ensure that increasing the rate of deceleration does not trigger loss of control, damage, and/or injury. Further, logic controller may be programmed to prioritize the deceleration limit 302 and/or the deceleration limit 206 to ensure that potential hazards are mitigated. However, the logic controller can perform checks on the rate of deceleration periodically, aperiodically, and/or continuously during the deceleration event 204 until the electric pallet jack stops or reaches an adjusted velocity 306 that is below a maximum velocity 308.

In some examples, the logic controller can be configured to manage the deceleration limit 302 and the maximum velocity 308 for electric pallet jacks that have positive velocity. In particular, the deceleration limit 302 can be configured to manage negative acceleration (e.g., a negative change in velocity over time) during the deceleration event 204. Additionally, the deceleration limit 302 can be associated with the safe deceleration limit 214 that may override the deceleration limit 302 and/or otherwise prevent the logic controller from entering operation that is unsafe for an object being transported by the electric pallet jack based on attributes of the electric pallet jack. Further, the deceleration limit 302 may be determined based on the safe deceleration limit 214 and the safe speed limit 312 to ensure that the electric pallet jack velocity is safely reduced to acceptable velocities during operation of the electric pallet jack. Accordingly, the deceleration limit 302 may be adjusted by the logic controller to ensure that the deceleration limit 302 is determined to prevent shifting of a load being carried, loss of control over the electric pallet jack, facility worker injury due to collision, and/or other damages potentially caused by rapid deceleration while reducing the electric pallet jack velocity below the maximum velocity 308.

In some additional examples, and similar to FIG. 2, the logic controller can be configured to manage the deceleration limit 302 and the maximum velocity 308 for the electric pallet jack independent of the load weight of the electric pallet jack. In particular, the logic controller can be configured to implement the deceleration limit 302 and the safe deceleration limit 214 based on the pallet jack velocity and the pallet jack acceleration independent of the load weight. Additionally, based at least on the deceleration limit 302 (e.g., the maximum or minimum deceleration for the electric pallet jack that is determined by the logic controller based on the operating state of the electric pallet jack and/or a programmed deceleration limit) the logic controller can modify the operating state of the motor and/or other component to maintain the rate of deceleration above (or below) the deceleration limit 302. The logic controller can be configured to iteratively alter the braking force and/or the operating of the motor to modify the rate of deceleration based at least on the deceleration limit 302 (or the deceleration limit 206).

In some further examples, the logic controller can be configured to manage the additional deceleration limit 304 and the additional maximum velocity 310 for electric pallet jacks that have negative velocity. In particular, the additional deceleration limit 304 can be configured to manage positive acceleration during a deceleration event where the electric pallet jack is moving with negative velocity (e.g., the electric pallet jack is in reverse). It should be noted that while the deceleration limit 302 and the additional deceleration limit 304 appear to be substantially equal, the additional deceleration limit 304 can be configured to enforce a different rate of deceleration from the deceleration limit 302. More specifically, moving an object in reverse may be associated with different constraints on deceleration due to the configuration of the electric pallet jack. Accordingly, the additional deceleration limit 304 and the additional maximum velocity 310 can be configured to ensure that reverse motion of the electric pallet jack can be safely managed by the logic controller.

FIG. 4 illustrates a diagram for managing a deceleration limit and a minimum velocity limit for an electric pallet jack in a loaded and/or unloaded state to ensure that control over the electric pallet jack is not lost and/or that the object transported by the electric pallet jack is not damaged. In particular, the electric pallet jack can be move, during an initial timeframe, at an initial velocity 402. Additionally, an acceleration event 404 can be detected and an acceleration limit 406 be implemented by a logic controller. It should be noted that the logic controller can be configured to provide the acceleration limit 406 for positive acceleration while the electric pallet jack is moving with positive velocity and an additional acceleration limit 408 for negative acceleration while the electric pallet jack is moving with negative velocity. Further, the electric pallet jack may be associated with a minimum velocity 210 for positive velocity and an additional minimum velocity 212 for negative velocity. Accordingly, the logic controller can be configured to maintain the acceleration limit 406 and the additional acceleration limit 408 for the electric pallet jack between a safe speed limit 410 for positive velocities and a safe speed limit 412 for negative velocities.

It should be noted that the diagram represents the velocity versus time chart for an electric pallet jack, wherein the shaded portions of the diagram indicate implemented control structures by the one or more logic controllers 106. While the illustrated velocity value does not cross into the shaded region in the illustrated diagram of FIG. 4, should the velocity (or acceleration/deceleration) of the electric pallet jack enter a shaded region, the controller is configured to execute velocity control(s) and/or acceleration control(s) to modify a pallet jack velocity and/or a pallet jack acceleration and rectify potentially hazardous and/or dangerous operation of the electric pallet jack. For example, where the electric pallet jack accelerates at an acceleration rate that is greater than a threshold represented by a slope of the acceleration limit 406, an acceleration limit controller/a deceleration limit controller may operate to increase the deceleration rate of the electric pallet jack. Similarly, if a velocity of the electric pallet jack is within and/or above the maximum velocity 308, a velocity limit controller may operate to reduce the velocity of the electric pallet jack.

In some examples, and similar to FIG. 2 and FIG. 3, an electric pallet jack may be traveling at an initial velocity 402 and undergo an acceleration event 404 triggered by a facility worker that is operating the electric pallet jack and/or otherwise triggered for the electric pallet jack. The electric pallet jack can initially be travelling at the initial velocity 402 that is determined for and/or by the logic controller based on one or more sensor/encoder indications. At the initiation of the acceleration event 404, the logic controller can determine a rate of acceleration that is caused by a motor of the electric pallet jack increasing power output to a drive wheel of the electric pallet jack. Additionally, the logic controller can be configured to identify the rate of acceleration, determine whether the rate of acceleration is greater than the acceleration limit 406, potentially decreasing the rate of acceleration where the rate of acceleration is greater than the acceleration limit 406. It should be noted that the acceleration limit 406 may be configured to permit the electric pallet jack to accelerate up to a safe speed limit 410 to ensure that accelerating does not trigger loss of control, damage, and/or injury. Further, the logic controller can perform checks on the rate of acceleration periodically, aperiodically, and/or continuously during the acceleration event 404 until the electric pallet jack is no longer being accelerated and/or reaches the safe speed limit 410.

For example, the electric pallet jack may lift a pallet of objects (e.g., via the lift system 104) and begin to move at the initial velocity 402. Once the electric pallet jack removes the pallet of objects from storage and enters a primary travel route the facility worker operating the electric pallet jack may begin to accelerate the electric pallet jack, initiating the acceleration event 404. As illustrated by FIG. 4, a logic controller (e.g., an acceleration limit controller) may determine the acceleration limit 406 based at least on a pallet jack velocity and a pallet jack load weight. The logic controller can continue to monitor a rate of acceleration (e.g., the slope of the line during the acceleration event 404) and determine whether the rate of acceleration for the electric pallet jack is greater than a maximum rate of acceleration for the pallet of objects and/or the portion of the storage facility the electric pallet jack is within. The logic controller can be configured to decrease the rate of acceleration during the acceleration event 404 should the rate of acceleration be greater than the rate of acceleration illustrated by the acceleration limit 406. By implementing the acceleration limit 406, the logic controller can prevent the objects on the pallet from sliding off of the pallet and potentially onto the facility worker, structures of the storage facility, and/or other objects. Additionally, the maximum velocity 308 can be defined for the electric pallet jack executing turns while transporting the pallet of goods while the safe speed limit 412 can represent a maximum velocity that is not to be exceeded by the electric pallet jack while transporting the pallet of goods having a load weight.

In some examples, the logic controller can be configured to manage the acceleration limit 406 under the safe speed limit 410 for electric pallet jacks that have positive velocity. In particular, the acceleration limit 406 can be configured to manage positive acceleration (e.g., a positive change in velocity over time) during the acceleration event 404. Additionally, the acceleration limit 406 can be associated with an acceleration minimum that defines how acceleration can be gradually reduced at the end of the acceleration event 404 to prevent sloshing of liquid inside of containers, shifting of loads, and other undesirable velocity effects. Further, the acceleration limit 406 may be determined to ensure that the electric pallet jack does not accelerate out of control from a facility worker. Accordingly, the acceleration limit 406 may be adjusted by the logic controller to ensure that the acceleration limit 406 is determined to prevent shifting of a load being carried, loss of control over the electric pallet jack, facility worker injury due to collision, and/or other damages potentially caused by rapid acceleration while increasing the electric pallet jack velocity below the safe speed limit 410.

In some additional examples, the logic controller can be configured to manage the additional acceleration limit 408 under the safe speed limit 412 for electric pallet jacks that have negative velocity. In particular, the additional acceleration limit 408 can be configured to manage negative acceleration during a deceleration event where the electric pallet jack is moving with negative velocity (e.g., the electric pallet jack is in reverse). It should be noted that while the acceleration limit 406 and the additional acceleration limit 408 appear to be substantially equal, the additional acceleration limit 408 can be configured to enforce a different rate of acceleration from the acceleration limit 406. More specifically, moving an object in reverse may be associated with different constraints on acceleration due to the configuration of the electric pallet jack. Accordingly, the additional acceleration limit 408 and the safe speed limit 412 can be configured to ensure that reverse motion of the electric pallet jack can be safely managed by the logic controller.

It should be noted that, for control structures implemented by the logic controller of an electric pallet jack, the deceleration limit (e.g., deceleration limit 206, deceleration limit 302, etc.) and the acceleration limit (e.g., the acceleration limit 406) may be applied for both positive velocity and negative velocity. Additionally, the control structures implemented by the logic controller can utilize active determinations (e.g., modifying the velocity, acceleration, and/or deceleration of the electric pallet jack based on substantially real-time determinations of pallet jack velocity and pallet jack acceleration) to determine the operation limits of the electric pallet jack and/or programmed control structures. For example, a programmed control structure may include determined acceleration limits for the electric pallet jack at a range of velocities such that a deceleration event and/or an acceleration event is controlled relative to the determined acceleration limits of the control structure. Alternatively, or in addition, an active determination of the control structure may utilize the pallet jack velocity and the pallet jack acceleration, optionally in combination with variables such as object proximity, operator proximity, load weight, and other variables, to determine the safe acceleration/deceleration limit for the electric pallet jack.

Figure 5:
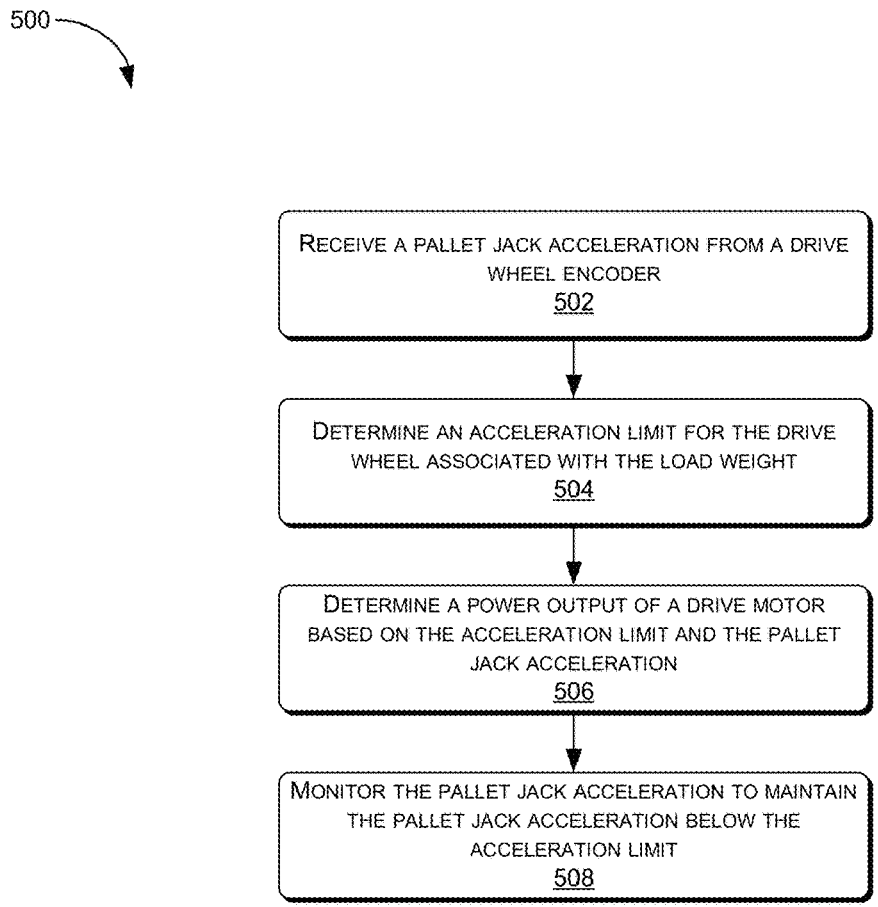
FIG. 5 illustrates an example flow diagram that describes operation of an acceleration logic controller and/or a velocity logic controller associated with an electric pallet jack.

FIG. 5 illustrates an example flow diagram that describes operation of an acceleration logic controller and/or a velocity logic controller associated with an electric pallet jack. It should be noted that a drive wheel encoder can be associated with a drive wheel of the electric pallet jack. Additionally, the drive wheel encoder can be configured to determine a pallet jack velocity and a pallet jack acceleration at a first time. Similarly, a load sensor can be configured to determine a load weight that being moved by the electric pallet jack at the pallet jack velocity and is accelerated by the pallet jack acceleration at the first time. Further, a drive motor can be configured to operate the drive wheel such that the load weight travels at the pallet jack velocity and is accelerated by the pallet jack acceleration at the first time.

At block 502, a logic controller can receive a pallet jack acceleration (or a pallet jack velocity) from the drive wheel encoder. In particular, the logic controller can receive an indication of a rate of rotation or a change in rate of rotation and convert the indication into the pallet jack acceleration or the pallet jack velocity. It should be noted that the pallet jack acceleration (or deceleration) and the pallet jack velocity can be caused by a facility worker operating the electric pallet jack. Alternatively, or in addition, the electric pallet jack can include safety features such as emergency stop, collision prevention controls, and other safety measures that cause and/or modify the pallet jack acceleration and/or the pallet jack velocity.

In some examples, the logic controller can receive an indication of the load weight from a weight sensor of the electric pallet jack. Alternatively, the load weight can be determined based on least on the pallet jack velocity and the power output of the drive motor, wherein the pallet jack velocity and the power output can be correlated with a range of load weights. Accordingly, the logic controller can track a load weight associated with an object that is being transported via the electric pallet jack and ensure that inertia from the object/the load weight does not adversely impact performance of the electric pallet jack.

At block 504, the logic controller can determine an acceleration limit that provides a maximum acceleration for the drive wheel. Additionally, the logic controller can determine whether the pallet jack acceleration at the first time exceeds the acceleration limit. Similarly, the logic controller can determine a velocity limit that provides a maximum velocity for the drive wheel. The velocity limit can be utilized to determine whether the pallet jack velocity at the first time exceeds the velocity limit. In particular, the acceleration limit and the velocity limit can be configured as threshold values that are partially defined based at least on the load weight. Due to the inertia of heavy objects (e.g., the electric pallet jack can be configured to lift and move objects that weigh over 1000 lbs., 2000 lbs., 3000 lbs., etc.), the acceleration limit can be determined to ensure that stop controls executed by the logic controller and/or the facility worker do not cause the object to fall off the electric pallet jack, to overturn the electric pallet jack, or otherwise cause a hazardous situation. Similarly, the velocity limit can be determined to ensure that stop controls can be completed at or under the acceleration limit while prevent collisions with objects, structures, and/or people. Accordingly, a set of acceleration limits and velocity limits can be correlated, based on load weight, with minimum stopping distances, maximum stopping distances, proximity sensor ranges, and other safety thresholds to prevent hazardous situations.

At block 506, the logic controller can determine a power output and/or a rate of power change for the drive motor. In particular, the rate of power change can be configured to limit a rate of acceleration for the load weight below the acceleration limit. Similarly, the power output can be configured to reduce the pallet jack velocity below the velocity limit. Additionally, the rate of power change and/or a limit to power output by the drive motor can ensure that the pallet jack acceleration and the pallet jack velocity can be maintained within safe operating conditions. It should be noted that the logic controller can be configured to determine the power output for the drive motor independent of the load weight carried by the electric pallet jack. For example, while the set of acceleration limits and the velocity limits may be determined in association with the load weight (or independent of load weight), the power output of the motor may be modified and monitored until the desired rate of acceleration is achieved for the pallet jack.

For example, at a load weight, the velocity limit can be determined to be a maximum velocity of 3.7 miles per hour. This can be determined such that object of the load weight can be moved forward, moved in reverse, turned greater than 30 degrees, and other operations within various distance thresholds. By ensuring that the motor cannot output greater power than the amount of power for moving at 3.7 miles per hour, the logic controller can permit the facility worker to freely operate the electric pallet jack while maintaining the capability to avoid hazards and damages. It should be noted that the above values can be adjusted based on a given scenario and are not intended to limit the scope of this disclosure.

At block 508, the logic controller can monitor the pallet jack acceleration and the pallet jack velocity. In particular, the logic controller can determine, at a second time, that the pallet jack acceleration has been reduced below the acceleration limit. Similarly, the logic controller can determine, at the second time, that the pallet jack velocity has been reduced below the velocity limit.

Figure 6:
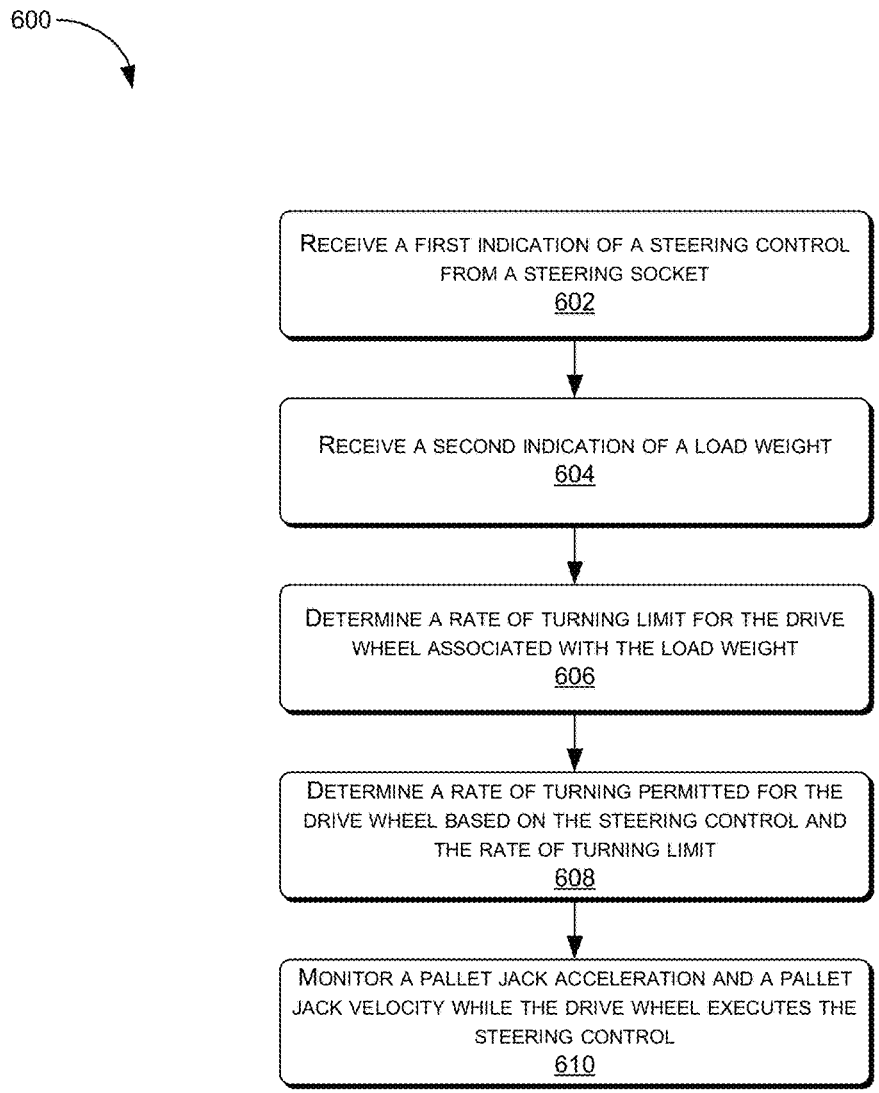
FIG. 6 illustrates an example flow diagram that describes operation of a turn logic controller associated with an electric pallet jack.

FIG. 6 illustrates an example flow diagram that describes operation of a turn logic controller associated with an electric pallet jack. It should be noted that the turn logic controller can operate in a system similar to the acceleration logic controller and the velocity logic controller while influencing the acceleration limit and velocity limit that is generated for the drive system.

At block 602, the logic controller can receive a first indication of a steering control from a steering socket. In particular, the steering control can be provided by a facility worker turning a steering column from a neutral position to a steered position that indicates a requested rate of turn. The requested rate of turn can be transmitted as the angle between the neutral position and the steered position of the steering column. Additionally, the logic controller can receive the first indication and determine the requested rate of turn for the electric pallet jack.

At block 604, the logic controller can receive a second indication of a load weight. In particular, the logic controller can receive and/or determine the load weight in a manner similar to that described by FIG. 5.

At block 606, the logic controller can determine a rate of turning limit for the drive wheel associated with the load weight. In particular, the rate of turning for the electric pallet jack can be associated with a hazardous operation zone. The hazardous operation zone can represent combinations of velocity thresholds, acceleration thresholds, and load weight thresholds that indicate elevated risks for overturn events during turns. More specifically, while a velocity limit or an acceleration limit may be acceptable in a straight path for a given load weight, turning the electric pallet jack may result in insufficient stabilizing forces for the object transported by the electric pallet jack. Accordingly, the hazardous operation zone can indicate a rate of turning limit (which may be zero) for a set of pallet jack velocity, pallet jack acceleration, and pallet jack load weight values.

At block 608, the logic controller can determine a rate of turning permitted for the drive wheel based on the steering control and the rate of turning limit. As noted above, excessive rates of turning can result in hazardous operation of the electric pallet jack. Accordingly, the pallet jack velocity and the pallet jack load weight can be correlated with the rate of turning limit that represents the maximum angle that the drive wheel is permitted to achieve. Additionally, the steering control can result in the rate of turning limit being increased via a reduction in the pallet jack velocity such that the electric pallet jack can be turned at a higher rate of turning.

It should be noted that the logic controller can restrict the rate of turning by receiving, from a steering sensor, an angle from the steering control provided by a facility worker and determining the requested rate of turning from the angle. After determining that the requested rate of turning exceeds a maximum rate of turning, the logic controller can reduce the rate of turning executed by the drive wheel. Additionally, the logical controller can determine a reduced acceleration limit that provides the maximum acceleration for the drive wheel during the turn and a reduced velocity limit for the drive wheel during the turn.

At block 610, the logic controller can monitor a pallet jack acceleration and a pallet jack velocity while the drive wheel executes the steering control.

Figure 7:
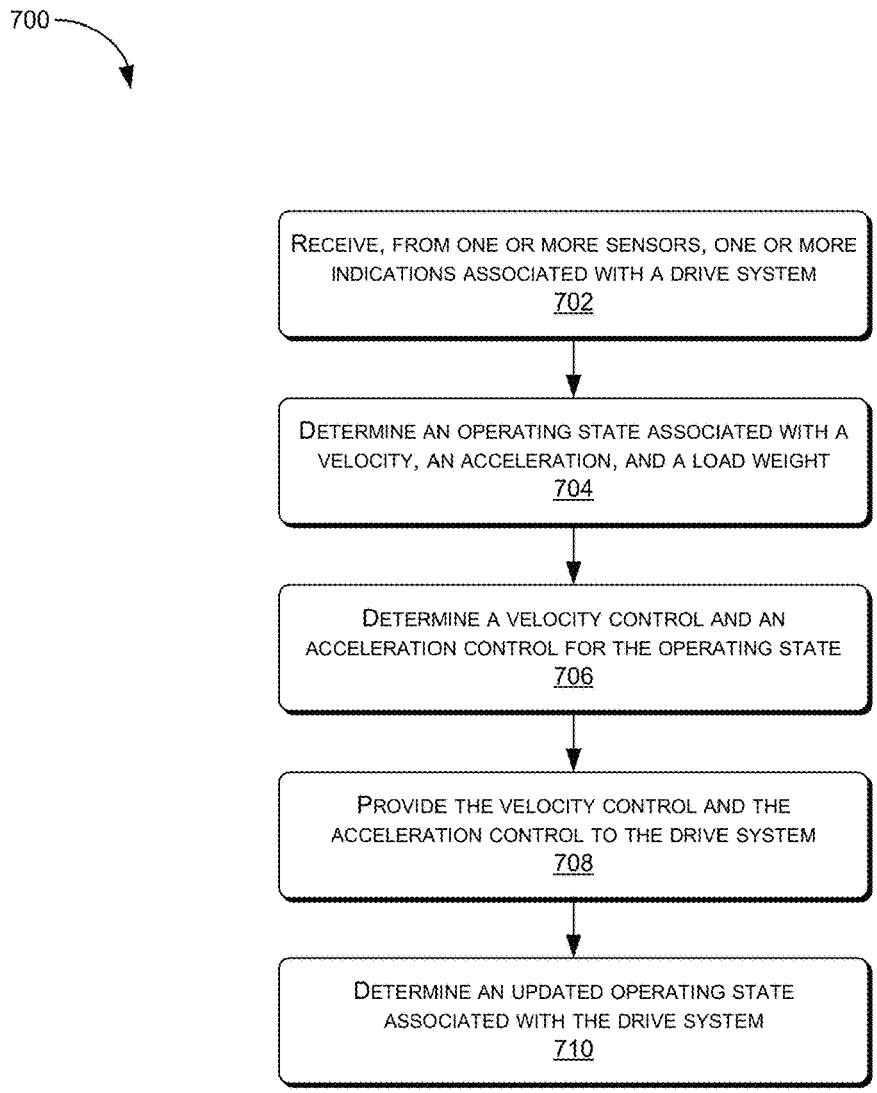
FIG. 7 illustrates an example flow diagram that describes operation of a logic controller that monitors and maintains operation of an electric pallet jack.

FIG. 7 illustrates an example flow diagram that describes operation of a logic controller that monitors and maintains operation of an electric pallet jack. It should be noted that the turn logic controller can operate in a system similar to the turn logic controller, the acceleration logic controller, and the velocity logic controller described above.

At block 702, a logic controller can receive, from one or more sensors, one or more indications associated with a drive system and a steering system. In particular, the one or more sensors can be associated with individual wheels of the electric pallet jack, axels of the electric pallet jack, a drive motor, a steering column, a steering socket, and/or other indicators of pallet jack velocity, pallet jack acceleration, pallet jack deceleration, and pallet jack turning.

At block 704, the logic controller can determine an operating state associated a pallet jack velocity, a pallet jack acceleration, and a pallet jack load weight. More specifically, the logic controller can determine the pallet jack velocity based at least on a rate of rotation associated with one or more wheels of the drive system, an operating speed of a drive motor of the drive system, and/or other indicators of pallet jack velocity. Similarly, the logic controller can determine the pallet jack acceleration from rates of change in the rate of rotation, the operation speed, and/or the other indicators of pallet jack velocity to determine the pallet jack acceleration. It should be noted that the operating state can include additional variables that may include a rate of turning, whether any objects are within a proximity threshold of the electric pallet jack, whether the facility worker operating the electric pallet jack is within a distance threshold of the electric pallet jack, and other indicators associated with operation of the electric pallet jack.

At block 706, the logic controller can be configured to determine, based at least on the pallet jack velocity and the pallet jack weight, a velocity control that defines a maximum velocity and a minimum velocity associated with the operating state. Similarly, the logic controller can be configured to determine, based at least on the pallet jack acceleration and the pallet jack load weight, an acceleration control that defines a set of acceleration limits and a set of deceleration limits.

At block 708, the logic controller can provide the velocity control and the acceleration control to the drive system. Additionally, the logic controller can monitor the operating state to determine whether the pallet jack velocity and the pallet jack acceleration satisfies the velocity control and the acceleration control. As noted above, the operating state can include additional indications from additional sensors. For example, monitoring the operating state can include monitoring a proximity boundary, via one or more proximity sensors, that is configured to indicate whether an object is obstructing a pallet jack path. Additionally, the logic controller can determine that the object is obstructing the pallet jack path and determine a stop control that causes the drive system to initiate deceleration less than or equal to a maximum deceleration for the electric pallet jack.

In at least one additional example, the logic controller can be configured to determine whether a facility worker operating the electric pallet jack is within the distance threshold for an operator of the electric pallet jack. In particular, the steering column can provide an indication of operator distance. It should be noted that the operator distance is a distance between the facility worker operating the electric pallet jack and the electric pallet jack. The operator distance can be determined based at least on an angle that handlebars and/or a steering column extend from the steering socket/steering joint and a length of the handlebars and/or the steering column. Additionally, as based on the indication of operator distance, the logic controller can generate a velocity control and an acceleration control that are configured to maintain the operator distance between a maximum operator distance and a minimum operator distance to prevent out-of-control scenarios and/or collisions with facility workers. For example, where the operator distance exceeds a maximum operator distance threshold, the handlebars may not be able to permit further growth of the operator distance, applying a force to the facility worker that unbalances the facility worker, causes the facility worker to fall, and/or otherwise lose control over the electric pallet jack. Similarly, where the operator distance is less than a minimum operator distance threshold, the facility worker operating the electric pallet jack may trip over the steering column or collide with the electric pallet jack.

In at least one further example, the logic controller can generate the velocity control and the acceleration control to include threshold values for operating states associated with a range of lead weights. More specifically, the velocity control can include a maximum forward velocity for a linear path, a maximum turning velocity, a maximum reverse velocity, and safe velocity limits associated with the plurality of load weights. Similarly the acceleration control can include a maximum forward acceleration for a linear path, a maximum turning acceleration, a maximum turning deceleration, a maximum reverse acceleration, a maximum reverse deceleration, and a maximum forward deceleration, and maximum emergency stop decelerations associated with a plurality of load weights. It should be noted that there may be a difference between the deceleration rate under standard conditions and the deceleration rate under emergency conditions where preventing injury is prioritized over damaging the object that is the electric pallet jack is transporting.

At block 710, the logic controller can determine, based at least on the velocity control and the acceleration control, an updated operating state that is implemented via the drive system.

Figure 8:
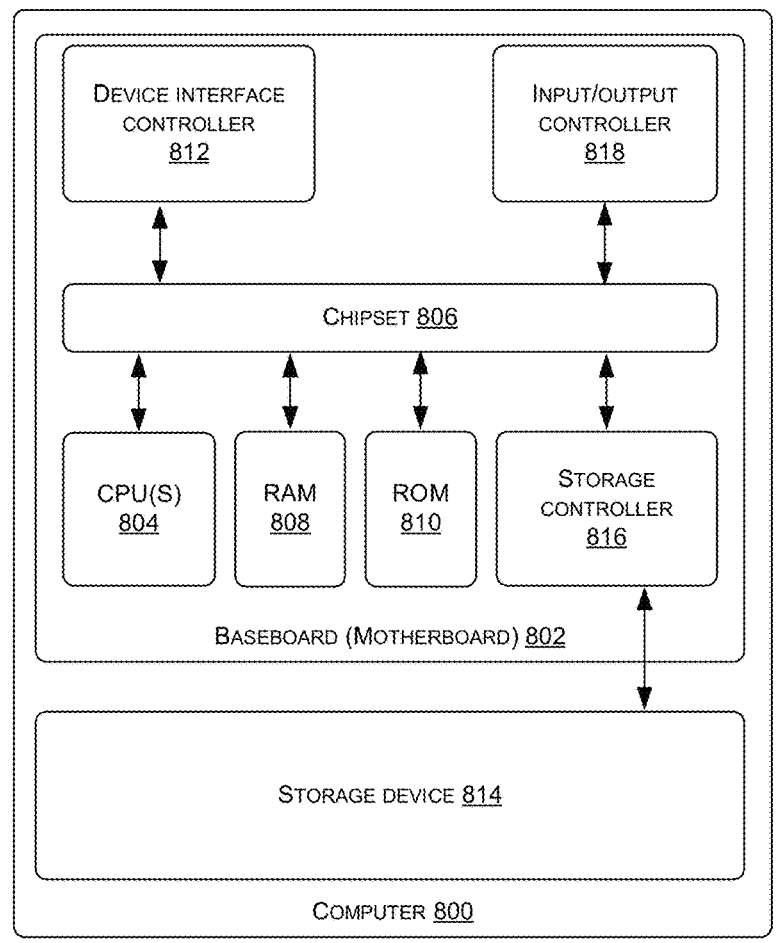
FIG. 8 illustrates a system network diagram for a computer that is configured to provide the functionality of one or more logic controllers associated with an electric pallet jack.

FIG. 8 shows an example computer architecture for a computer 800 capable of executing program components for implementing the enhancement systems and enrichment systems described above. The computer architecture shown in FIG. 8 illustrates a server computer, workstation, desktop computer, laptop, tablet, network appliance, e-reader, smartphone, or other computing device, and may be utilized to execute any of the software components presented herein. In some examples, the computer 800 may correspond to one or more computing devices that implements the components and/or services described herein. In some additional examples, the computer 800 may correspond the enrichment system and/or the enhancement system. In some further examples, the computer 800 can be configured to interact with or correspond to any of the systems and/or implement the methods discussed in FIGS. 1-8.

The computer 800 includes a baseboard 802, or "motherboard," which is a printed circuit board to which a multitude of components or devices may be connected by way of system(s) bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

In some alternative examples, the CPUs 804 can be replaced and/or be configured to interact with one or more processors. It should be noted that the one or more processors can include the CPUs 804, one or more graphics processing units (GPUs), both the CPUs 804 and GPUs, and/or other processing units or components known in the art. For example, the one or more processors can include one or more processing units configured as controllers, microcontrollers, computational devices, microprocessors, and/or other computational devices configured to control and/or cause a user device to execute the operations described above.

The chipset 806 provides an interface between the CPUs 804 and the remainder of the components and devices on the baseboard 802. The chipset 806 may provide an interface to a random-access memory (RAM) 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a local network between the computer 800, the logic controllers implemented via the CPUs 804, and the sensors/encoders of the electric pallet jack. The chipset 806 may include functionality for providing connectivity through a device interface controller 812. The device interface controller 812 is capable of connecting the computer 800 to other devices such that indications can be received and transmitted to and from the sensors, encoders, and systems of the electric pallet jack. It should be appreciated that multiple device interface controllers 812 may be present in the computer 800, connecting the computer to other types of networks and computer systems. In some examples, the device interface controller 812 can be associated with one or more transceivers that can include one or more wired or wireless transceivers. For example, the transceivers can include a network adapter, a local area network adapter, an address associated with a network connection, or another device permitting communications to be sent and received. Additionally, the one or more transceivers can comprise any wireless transceiver capable of engaging in wireless, radio frequency (RF) communication. Further, the one or more transceivers can also include other wireless modems, such as Wi-Fi, WiMAX, Bluetooth, and/or infrared communication modems.

The computer 800 may be connected to a mass storage device 814 that provides non-volatile storage for the computer 800. The mass storage device 814 may store an operating system, programs, and/or components including, without limitation, the logic controllers 106 that processes and/or utilize data from the one or more sensors 112 and the one or more encoders 114 within data pipelines, as described herein, and data, which have been described in greater detail herein. The mass storage device 814 may be connected to the computer 800 through a storage controller 816 connected to the chipset 806. The mass storage device 814 may consist of one or more physical storage units. The storage controller 816 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 814 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 814 is characterized as primary or secondary storage, and the like.

For example, the computer 800 may store information to the mass storage device 814 by issuing instructions through the storage controller 816 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 814 by detecting the physical states or characteristics of one or more particular locations within the physical storage units.

In addition to the mass storage device 814 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800. In some examples, the operations performed by the logic controllers 106, and or any components and/or services included therein, may be carried out by the processor(s).

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 814 may store an operating system utilized to control the operation of the computer 800. According to one embodiment, the operating system comprises the LINUX operating system. According to another embodiment, the operating system comprises the WINDOWS® SERVER operating system from MICROSOFT® Corporation of Redmond, Washington. According to further embodiments, the operating system may comprise the UNIX operating system or one of its variants. It should be appreciated that other operating systems may also be utilized. The mass storage device 814 may store other system or application programs and data utilized by the computer 800.

In one embodiment, the mass storage device 814 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-5. The computer 800 may also include computer-readable storage media having instructions stored thereupon for performing any of the other computer-implemented operations described herein.

The computer 800 may also include one or more input/output controllers 818 for receiving and processing input from a number of input devices, such as a keyboard, a mouse, a touchpad, a touch screen, an electronic stylus, or other type of input device. Similarly, an input/output controller 818 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

While various examples and embodiments are described individually herein, the examples and embodiments may be combined, rearranged, and modified to arrive at other variations within the scope of this disclosure. Additionally, and although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
   a drive wheel encoder that is associated with a drive wheel and is configured to determine a pallet jack velocity and a pallet jack acceleration of an electric pallet jack at a first time;
   a load sensor that is configured to determine a load weight of a load, carried by the electric pallet jack, that is travelling at the pallet jack velocity and being accelerated by the pallet jack acceleration at the first time;
   a drive motor that is configured to operate the drive wheel such that the load weight travels at the pallet jack velocity and is accelerated by the pallet jack acceleration at the first time;
   an acceleration limit controller that is configured to:
      receive, from the drive wheel encoder, a first indication of the pallet jack acceleration;
      receive, from the load sensor, a second indication of the load weight;
      determine, based on the load weight, an acceleration limit that provides a maximum acceleration for the drive wheel;
      determine, based on the acceleration limit, that the pallet jack acceleration at the first time meets or exceeds the acceleration limit;
      determine, based on the pallet jack acceleration meeting or exceeding the acceleration limit, a rate of power change for the drive motor, the rate of power change configured to limit a rate of acceleration for the load weight below the acceleration limit; and
      determine, at a second time, that the pallet jack acceleration has been reduced below the acceleration limit; and
   a velocity limit controller that is configured to:

receive, from the drive wheel encoder, a third indication of the pallet jack velocity;
receive, from the load sensor, the second indication of the load weight;
determine, based on the load weight, a velocity limit that provides a maximum velocity for the drive wheel;
determine, based on the velocity limit, that the pallet jack velocity at the first time meets or exceeds the velocity limit;
determine, based on the pallet jack velocity meeting or exceeding the velocity limit, a power limit for the drive motor, the power limit configured to limit a maximum velocity for the load weight; and
determine, at the second time, that the pallet jack velocity has been reduced below the velocity limit.

2. The system as recited in claim 1, further comprising a steering sensor that is configured to determine whether a steering control is being provided to initiate a turn and an angle between a neutral position and the steering control for the turn.

3. The system as recited in claim 2, further comprising a turn limit controller that is configured to:
receive, from the steering sensor, the steering control that is initiating the turn and a fourth indication of the angle of the steering control;
receive, from the load sensor, the second indication of the load weight;
determine, based on the load weight, a maximum rate of turning for the steering control;
determine, based on the angle associated with the steering control, that a rate of turning associated with the angle of the steering control meets or exceeds the maximum rate of turning; and
determine, based on the maximum rate of turning and the rate of turning, a drive wheel angle to implement the steering control.

4. The system as recited in claim 2, wherein determining the acceleration limit further comprises:
receive, from the steering sensor, a fourth indication of the angle from the steering control;
determine that the drive wheel is executing the turn;
determine, based on the angle from the steering control and the load weight, a reduced acceleration limit that provides the maximum acceleration for the drive wheel during the turn; and
utilize the reduced acceleration limit in place of the acceleration limit while the drive wheel is executing the turn.

5. The system as recited in claim 2, wherein determining the velocity limit further comprises:
receive, from the steering sensor, a fourth indication of the angle from the steering control;
determine that the drive wheel is executing the turn;
determine, based on the angle from the steering control and the load weight, a reduced velocity limit that provides the maximum velocity for the drive wheel during the turn; and
utilize the reduced velocity limit in place of the velocity limit while the drive wheel is executing the turn.

6. A method comprising:
receiving, from one or more sensors, one or more indications associated with a drive system and a steering system associated with an electric pallet jack, the one or more indications indicating a load weight of a load being carried by the electric pallet jack;
determining, based at least on the one or more indications, an operating state associated with a pallet jack velocity and a pallet jack acceleration;
determining, based at least on the load weight of the load and the pallet jack velocity, a velocity control that defines a maximum velocity and a minimum velocity associated with the operating state;
determining, based at least on the load weight of the load and the pallet jack acceleration, an acceleration control that defines a set of acceleration limits and a set of deceleration limits;
monitoring the operating state to determine whether the pallet jack velocity satisfies the velocity control and whether the pallet jack acceleration satisfies the acceleration control; and
determining, based at least on the velocity control or the acceleration control, an updated operating state that is implemented via the drive system.

7. The method of claim 6, further comprising:
determining, based at least on the one or more indications, a steering control that indicates a requested rate of turning, wherein the steering control indicates an angle between a steering column position and a neutral position that correlates to the requested rate of turning.

8. The method of claim 7, wherein determining the maximum velocity and the minimum velocity for the operating state further comprises:
determining whether the requested rate of turning and the pallet jack velocity are correlated with a hazardous operation zone, wherein the hazardous operation zone is indicated by a first set of turn rate thresholds and a second set of velocity thresholds that are associated with the electric pallet jack experiencing an overturn event; and
determining, based at least on the requested rate of turn and the pallet jack velocity being correlated with the hazardous operation zone, the maximum velocity that is less than the second set of velocity thresholds.

9. The method of claim 7, wherein determining the set of acceleration limits further comprises:
determining whether the requested rate of turning and the pallet jack acceleration are correlated with a hazardous operation zone, wherein the hazardous operation zone is indicated by a first set of turn rate thresholds and a second set of acceleration thresholds that are associated with the electric pallet jack experiencing an overturn event or a collision event with one or more objects; and
determining, based at least on the requested rate of turn and the pallet jack velocity being correlated with the hazardous operation zone, a maximum acceleration that is less than the second set of acceleration thresholds.

10. The method of claim 7, further comprising:
determining, based at least on the pallet jack velocity, a maximum rate of turning for the steering control, wherein the pallet jack velocity is associated with a range of turning rates that includes the maximum rate of turning;
determining, based on the maximum rate of turning and the requested rate of turning, whether the requested rate of turning is less than the maximum rate of turning; and
providing the steering control to the drive system based at least on the requested rate of turning being less than the maximum rate of turning.

11. The method of claim 7, wherein the one or more sensors include a first sensor associated with a first wheel of the electric pallet jack and a second sensor associated with a second wheel of the electric pallet jack that is different than the first wheel, further comprising:
  receiving, from the first sensor, a first indication of the one or more indications;
  receiving, from the second sensor, a second indication of the one or more indications;
  determining, based at least in part on the first indication and independently from the second indication, the pallet jack velocity associated with the first wheel; and
  determining, based at least in part on the second indication and independently from the first indication, the pallet jack velocity associated with the second wheel.

12. The method of claim 7, wherein:
  the velocity control and the acceleration control are associated with a first area of an environment in which the electric pallet jack resides, but not other areas of the environment; or
  the velocity control and the acceleration control are associated with one or more objects included in the load, but not other objects absent from the load.

13. The method of claim 6, wherein the operating state further comprises a proximity boundary that is configured to indicate whether an object is obstructing a pallet jack path traversed by electric pallet jacks, including the electric pallet lack.

14. The method of claim 13, further comprising:
  determining, based at least on the proximity boundary, that the object is obstructing the pallet jack path and an ability of the electric pallet jack to traverse the pallet jack path; and
  determining a stop control that is configured to cause the drive system to initiate deceleration within the set of deceleration limits and avoid collision with the object.

15. The method of claim 6, wherein:
  the steering system provides an additional indication of operator distance, wherein the operator distance is a distance between an operator and the electric pallet jack;
  the velocity control and the acceleration control are configured to maintain the operator distance below a maximum operator distance to prevent the electric pallet jack from being equal to or greater than a threshold distance from the operator; and
  the velocity control and the acceleration control are configured to maintain the operator distance above a minimum operator distance threshold to prevent a facility worker from colliding with a pallet jack load.

16. A system comprising:
  one or more processors; and
  a memory storing one or more instructions that are executable by the one or more processors to perform operations comprising:
    receiving, from one or more sensors, one or more indications associated with a rotational velocity of one or more wheels of a drive system of an electric pallet jack, the one or more indications indicating a load weight of a load being carried by the electric pallet jack;
    determining, based at least on the one or more indications, a pallet jack velocity and a pallet jack acceleration, the pallet jack velocity correlated to the rotational velocity and the pallet jack acceleration correlated to a rate of change for the rotational velocity;
    determining, based at least on the one or more indications, the load weight of the load, and an operating state of the drive system, a velocity control that defines a maximum velocity and an acceleration control that defines a maximum acceleration for an object and the electric pallet jack;
    determining, based at least on the velocity control and the acceleration control, that at least one of the pallet jack velocity meets or exceeds the maximum velocity or the pallet jack acceleration meets or exceeds the maximum acceleration; and
    providing, to the drive system, an updated operating state that is configured to reduce a power output of the drive system to reduce at least one of the pallet jack velocity or the pallet jack acceleration.

17. The system of claim 16, wherein determining the pallet jack velocity further comprises:
  determining, for a first wheel of the one or more wheels, a second rotational velocity;
  determining, for a second wheel of the one or more wheels, a third rotational velocity;
  determining, for a drive motor of the drive system, a fourth rotational velocity of the drive motor and a gear ratio between the drive motor and the one or more wheels;
  determining a second pallet jack velocity from the second rotational velocity, a third pallet jack velocity from the third rotational velocity, and a fourth pallet jack velocity from the fourth rotational velocity and gear ratio; and
  determining the pallet jack velocity based at least on the second pallet jack velocity, the third pallet jack velocity, and the fourth pallet jack velocity.

18. The system of claim 16, wherein:
the maximum velocity is a maximum forward velocity for a linear path; and
the velocity control further comprises a maximum turning velocity, a maximum reverse velocity, and determined velocity limits associated with a plurality of load weights.

19. The system of claim 16, wherein:
the maximum acceleration is a maximum forward acceleration for a linear path; and
the velocity control further comprises a maximum turning acceleration, a maximum turning deceleration, a maximum reverse acceleration, a maximum reverse deceleration, a maximum forward deceleration, and maximum emergency stop decelerations associated with a plurality of load weights.

20. The system of claim 16, wherein:
the maximum velocity and the maximum acceleration are determined based at least on a proximity sensor indicating that an obstacle is within a threshold distance of the object; and
the updated operating state is generated based at least on the proximity sensor indicating that the obstacle is within the threshold distance.

* * * * *